INVENTOR.
CONSTANTIN M. MELAS
BY
Richard E. Cummins
ATTORNEY

Oct. 19, 1965 C. M. MELAS 3,213,426

ERROR CORRECTING SYSTEM

Filed Sept. 25, 1959 7 Sheets-Sheet 3

FIG. 3

ENCODING OF: $D_9 D_8 D_7 D_6 D_5 D_4 D_3 D_2 D_1$ → $P_3 P_2 P_1 P_4 \Pi_1 D_9 D_8 D_7 \Pi_2 D_6 D_5 D_4 D_3 D_2 D_1$ 0 1 0 1 0 0 1 1 0 → 0 1 1 0 1 0 1 0 0 1 0 0 1 1 0

| CLOCK PULSE | SHIFT PULSE | IN BITS | ⊕ $F_1$ $F_2$ $F_3$ $F_4$ | $P_1$ $P_2$ $P_3$ $P_4$ | ⊕ $G_1$ $G_2$ | $\Pi_1\Pi_2$ | SHIFT REGISTER 1 2 3 4 5 6 7 8 9 | OUT BITS |
|---|---|---|---|---|---|---|---|---|
| START | | | 0 0 1 0 | 0 0 0 0 | 1 1 | 0 0 | - - - - - - - - - | |
| | 1 | | 1 0 0 1 | | 0 1 | | | |
| 1 | | $D_1$ - 0 | | 0 0 0 0 | | 0 0 | 0 - - - - - - - - | |
| | 2 | | 1 1 0 0 | | 1 0 | | | |
| 2 | | $D_2$ - 1 | | 1 1 0 0 | | 1 0 | 1 0 - - - - - - - | |
| | 3 | | 0 1 1 0 | | 1 1 | | | |
| 3 | | $D_3$ - 1 | | 1 0 1 0 | | 0 1 | 1 1 0 - - - - - - | |
| | 4 | | 1 0 1 1 | | 0 1 | | | |
| 4 | | $D_4$ - 0 | | 1 0 1 0 | | 0 1 | 0 1 1 0 - - - - - | |
| | 5 | | 0 1 0 1 | | 1 0 | | | |
| 5 | | $D_5$ - 0 | | 1 0 1 0 | | 0 1 | 0 0 1 1 0 - - - - | |
| | 6 | | 1 0 1 0 | | 1 1 | | | |
| 6 | | $D_6$ - 1 | | 0 0 0 0 | | 1 0 | 1 0 0 1 1 0 - - - | |
| | 7 | | 1 1 0 1 | | 0 1 | | | |
| 7 | | - | | - - - - | | - - | - 1 0 0 1 1 0 - - | |
| | 8 | | 1 1 1 0 | | 1 0 | | | |
| 8 | | $D_7$ - 0 | | 0 0 0 0 | | 1 0 | 0 - 1 0 0 1 1 0 - | |
| | 9 | | 1 1 1 1 | | 1 1 | | | |
| 9 | | $D_8$ - 1 | | 1 1 1 1 | | 0 1 | 1 0 - 1 0 0 1 1 0 | |
| | 10 | | 0 1 1 1 | | 0 1 | | | |
| 10 | | $D_9$ - 0 | | | | 0 1 | 0 1 0 - 1 0 0 1 1 | $D_1$ - 0 |
| | 11 | | 0 0 1 1 | | 1 0 | | | |
| 11 | | - | | | | - - | - 0 1 0 - 1 0 0 1 | $D_2$ - 1 |
| | 12 | | 0 0 0 1 | | 1 1 | | | |
| 12 | | $P'_4$ - 1 | | | | 1 0 | - - 0 1 0 - 1 0 0 | $D_3$ - 1 |
| | 13 | | 1 0 0 0 | | 0 1 | | | |
| 13 | | $P'_1$ - 1 | | | | 1 1 | - - - 0 1 0 - 1 0 | $D_4$ - 0 |
| | 14 | | 0 1 0 0 | | 1 0 | | | |
| 14 | | $P'_2$ - 1 | | | | 0 1 | - - - - 0 1 0 - 1 | $D_5$ - 0 |
| | 15 | | 0 0 1 0 | | 1 1 | | | |
| 15 | | $P'_3$ - 1 | | | | 1 0 | - - - - - 0 1 0 - | $D_6$ - 1 |
| | 16 | | | | | | | |
| 16 | | ADD $\Pi_1$ = 1 | TO $P'_3$, $P'_4$ | 1 1 0 0 | | | - - - - - - 0 1 0 | $\Pi_2$ - 0 |
| | 17 | | | | | | | |
| 17 | | ADD $\Pi_2$ = 0 | TO $P'_1$, $P'_2$, $P'_3$ | 1 1 0 0 | | | - - - - - - - 0 1 | $D_7$ - 0 |
| | 18 | | | | | | | |
| 18 | | | | | | | - - - - - - - - 0 | $D_8$ - 1 |
| | 19 | | | | | | | |
| 19 | | | | | | | - - - - - - - - - | $D_9$ - 0 |
| | 20 | | | | | | | |
| 20 | | | | | | | | $\Pi_1$ - 1 |
| | 21 | | | | | | | |
| 21 | | | | | | | | $P_4$ - 0 |
| | 22 | | | | | | | |
| 22 | | | | | | | | $P_1$ - 1 |
| | 23 | | | | | | | |
| 23 | | | | | | | | $P_2$ - 1 |
| | 24 | | | | | | | |
| 24 | | | | | | | | $P_3$ - 0 |

| | $D_1$ | $D_2$ | $D_3$ | $D_4$ | $D_5$ | $D_6$ | $\Pi_2$ | $D_7$ | $D_8$ | $D_9$ | $\Pi_1$ | $P_4$ | $P_1$ | $P_2$ | $P_3$ |
|---|---|---|---|---|---|---|---|---|---|---|---|---|---|---|---|
| $P_1$ | X | X | | X | | X | X | X | X | | | | X | | |
| $P_2$ | | X | X | | X | | X | X | X | X | | | | X | |
| $P_3$ | | | X | X | | X | | X | X | X | X | | | | X |
| $P_4$ | X | | | X | X | | X | | X | X | X | X | | | |
| $\Pi_1$ | | X | X | | X | X | | X | X | | X | X | | X | X |
| $\Pi_2$ | X | | X | X | | X | X | | X | X | | X | X | | X |

FIG. 4

ERROR CORRECTING SYSTEM

FIG. 6

DECODING OF: $\overrightarrow{P_3P_2P_1P_4\Pi_1D_9D_8D_7\Pi_2D_6D_5D_4D_3D_2D_1}$ 0 1 1 0 1 0 1 0 0 1 0 0 1 1 0   $\overrightarrow{D_9D_8D_7D_6D_5D_4D_3D_2D_1}$ 0 1 0 1 0 0 1 1 0

| CLOCK | SHIFT | IN BITS | $F_1$ $F_2$ $F_3$ $F_4$ | $P_1$ $P_2$ $P_3$ $P_4$ | $G_1$ $G_2$ | $\Pi_1$ $\Pi_2$ | $P_3P_2P_1P_4\Pi_1D_9D_8D_7\Pi_2D_6D_5D_4D_3D_2D_1$ (1 2 3 4 5 6 7 8 9 10 11 12 13 14 15) |
|---|---|---|---|---|---|---|---|
| START | | | 0 0 1 0 | 0 0 0 0 | 1 1 | 0 0 | - - - - - - - - - - - - - - - |
| | 1 | | 1 0 0 1 | | 0 1 | | |
| 1 | | $D_1$ – 0 | | 0 0 0 0 | | 0 0 | 0 - - - - - - - - - - - - - - |
| | 2 | | 1 1 0 0 | | 1 0 | | |
| 2 | | $D_2$ – 1 | | 1 1 0 0 | | 1 0 | 1 0 - - - - - - - - - - - - - |
| | 3 | | 0 1 1 0 | | 1 1 | | |
| 3 | | $D_3$ – 1 | | 1 0 1 0 | | 0 1 | 1 1 0 - - - - - - - - - - - - |
| | 4 | | 1 0 1 1 | | 0 1 | | |
| 4 | | $D_4$ – 0 | | 1 0 1 0 | | 0 1 | 0 1 1 0 - - - - - - - - - - - |
| | 5 | | 0 1 0 1 | | 1 0 | | |
| 5 | | $D_5$ – 0 | | 1 0 1 0 | | 0 1 | 0 0 1 1 0 - - - - - - - - - - |
| | 6 | | 1 0 1 0 | | 1 1 | | |
| 6 | | $D_6$ – 1 | | 0 0 0 0 | | 1 0 | 1 0 0 1 1 0 - - - - - - - - - |
| | 7 | | 1 1 0 1 | | 0 1 | | |
| 7 | | $\Pi_2$ – 0 | | 0 0 0 0 | | 1 0 | 0 1 0 0 1 1 0 - - - - - - - - |
| | 8 | | 1 1 1 0 | | 1 0 | | |
| 8 | | $D_7$ – 0 | | 0 0 0 0 | | 1 0 | 0 0 1 0 0 1 1 0 - - - - - - - |
| | 9 | | 1 1 1 1 | | 1 1 | | |
| 9 | | $D_8$ – 1 | | 1 1 1 1 | | 0 1 | 1 0 0 1 0 0 1 1 0 - - - - - - |
| | 10 | | 0 1 1 1 | | 0 1 | | |
| 10 | | $D_9$ – 0 | | 1 1 1 1 | | 0 1 | 0 1 0 0 1 0 0 1 1 0 - - - - - |
| | 11 | | 0 0 1 1 | | 1 0 | | |
| 11 | | $\Pi_1$ – 1 | | 1 1 0 0 | | 1 1 | 1 0 1 0 0 1 0 0 1 1 0 - - - - |
| | 12 | | 0 0 0 1 | | 1 1 | | |
| 12 | | $P_4$ – 0 | | 1 1 0 0 | | 1 1 | 0 1 0 1 0 0 1 0 0 1 1 0 - - - |
| | 13 | | 1 0 0 0 | | 0 1 | | |
| 13 | | $P_1$ – 1 | | 0 1 0 0 | | 1 0 | 1 0 1 0 1 0 0 1 0 0 1 1 0 - - |
| | 14 | | 0 1 0 0 | | 1 0 | | |
| 14 | | $P_2$ – 1 | | 0 0 0 0 | | 0 0 | 1 1 0 1 0 1 0 0 1 0 0 1 1 0 - |
| | 15 | | 0 0 1 0 | | 1 1 | | |
| 15 | | $P_3$ – 0 | | 0 0 0 0 | | 0 0 | 0 1 1 0 1 0 1 0 0 1 0 0 1 1 0 |

FIG. 6a

DECODING OF: $\overrightarrow{P_3P_2P_1P_4\Pi_1D_9D_8D_7\Pi_2D_6D_5D_4D_3D_2D_1}$ 0 1 1 1 0 1 1 0 0 1 0 0 1 1 0   $\overrightarrow{D_9D_8D_7D_6D_5D_4D_3D_2D_1}$ 0 1 0 1 0 0 1 1 0

| | | | | | | | |
|---|---|---|---|---|---|---|---|
| 9 | | | | 1 1 1 1 | | 0 1 | 1 0 0 1 0 0 1 1 0 - - - - - - |
| | 10 | | 0 1 1 1 | | 0 1 | | |
| 10 | | $D_9$ – **1** | | 1 0 0 0 | | 0 0 | **1** 1 0 0 1 0 0 1 1 0 - - - - - |
| | 11 | | 0 0 1 1 | | 1 0 | | |
| 11 | | $\Pi_1$ – **0** | | 1 0 0 0 | | 0 0 | **0** **1** 1 0 0 1 0 0 1 1 0 - - - - |
| | 12 | | 0 0 0 1 | | 1 1 | | |
| 12 | | $P_4$ – **1** | | 1 0 0 1 | | 1 1 | **1** **0** **1** 1 0 0 1 0 0 1 1 0 - - - |
| | 13 | | 1 0 0 0 | | 0 1 | | |
| 13 | | $P_1$ – 1 | | 0 0 0 1 | | 1 0 | 1 **1** **0** **1** 1 0 0 1 0 0 1 1 0 - - |
| | 14 | | 0 1 0 0 | | 1 0 | | |
| 14 | | $P_2$ – 1 | | 0 1 0 1 | | 0 0 | 1 1 **1** **0** **1** 1 0 0 1 0 0 1 1 0 - |
| | 15 | | 0 0 1 0 | | 1 1 | | |
| 15 | | $P_3$ – 0 | | 0 1 0 1 | | 0 0 | 0 1 1 **1** **0** **1** 1 0 0 1 0 0 1 1 0 |

FIG. 6b

LOCATING "111" TYPE ERROR

| $P_3$ | $P_2$ | $P_1$ | $P_4$ | $\pi_1$ | $D_9$ | $D_8$ | $D_7$ | $\pi_2$ | $D_6$ | $D_5$ | $D_4$ | $D_3$ | $D_2$ | $D_1$ |
|---|---|---|---|---|---|---|---|---|---|---|---|---|---|---|
| 0 | 1 | 1 | **1** | **0** | **1** | 1 | 0 | 0 | 1 | 0 | 0 | 1 | 1 | 0 |

| SHIFT PULSE | $P_1$ | $P_2$ | $P_3$ | $P_4$ | $F_1$ | $F_2$ | $F_3$ | $F_4$ | $\pi_1$ | $\pi_2$ | $G_1$ | $G_2$ | COUNTER 156 "0 – 14" | COUNTER 140 "0 – 3" | CORRECTOR REG. 158 | | | CORRECTOR MOD. UNIT 159 | |
|---|---|---|---|---|---|---|---|---|---|---|---|---|---|---|---|---|---|---|---|
| START | 0 | 1 | 0 | 1 | 0 | 0 | 1 | 0 | 0 | 0 | 1 | 1 | 0 | 0 | 0 | 0 | 1 | – | – |
| 16 | | | | | 1 | 0 | 0 | 1 | | | 0 | 1 | 1 | 0 | 0 | 0 | 1 | – | – |
| 17 | | | | | 1 | 1 | 0 | 0 | | | 1 | 0 | 2 | 0 | 0 | 0 | 1 | – | – |
| 18 | | | | | 0 | 1 | 1 | 0 | | | 1 | 1 | 3 | 0 | 0 | 0 | 1 | – | – |
| 19 | | | | | 1 | 0 | 1 | 1 | | | 0 | 1 | 4 | 0 | 0 | 0 | 1 | – | – |
| 20 | P.F. COMPARE → | | | | 0 | 1 | 0 | 1 | | | 1 | 0 | 5 | 0 | 0 | 0 | 1 | – | – |
| 21 | | | | | 1 | 0 | 1 | 0 | | | 1 | 1 | 1 | 1 | 0 | 1 | 1 | – | 4 |
| 22 | | | | | 1 | 1 | 0 | 1 | | | 0 | 1 | 12 | 2 | 1 | 0 | 1 | – | 4 |
| 23 | | | | | 1 | 1 | 1 | 0 | | | 1 | 0 | 10 | 3 | 1 | 1 | 1 | – | 2 |
| 24 | | | | | 1 | 1 | 1 | 1 | | | 1 | 1 | | | | | | | |
| 25 | | | | | 0 | 1 | 1 | 1 | | | 0 | 1 | | | | | | | |
| 26 | | | | | 0 | 0 | 1 | 1 | | | 1 | 0 | | | | | | | |
| 27 | | | | | 0 | 0 | 0 | 1 | | | 1 | 1 | | | | | | | |
| 28 | | | | | 1 | 0 | 0 | 0 | | | 0 | 1 | | | | | | | |
| 29 | | | | | 0 | 1 | 0 | 0 | | | 1 | 0 | | | | | | | |
| 30 | | | | | 0 | 0 | 1 | 0 | | | 1 | 1 | 10 | 3 | 1 | 1 | 1 | | |

FIG. 6c

CORRECTING "111" TYPE ERROR IN BIT POSITIONS 10-11 AND 12

| SHIFT PULSE | COUNTER 156 | 1 | 2 | 3 | 4 | 5 | 6 | 7 | 8 | 9 | 10 | 11 | 12 | 13 | 14 | 15 | DATA OUT | | |
|---|---|---|---|---|---|---|---|---|---|---|---|---|---|---|---|---|---|---|---|
| START | 10 | 0 | 1 | 1 | **1** | **0** | **1** | 1 | 0 | 0 | 1 | 0 | 0 | 1 | 1 | 0 | | | |
| 1 | 9 | – | 0 | 1 | 1 | **1** | **0** | **1** | 1 | 0 | 0 | 1 | 0 | 0 | 1 | 1 | $D_1$ | 0 | |
| 2 | 8 | – | – | 0 | 1 | 1 | **1** | **0** | **1** | 1 | 0 | 0 | 1 | 0 | 0 | 1 | $D_2$ | 1 | 0 |
| 3 | 7 | – | – | – | 0 | 1 | 1 | **1** | **0** | **1** | 1 | 0 | 0 | 1 | 0 | 0 | $D_3$ | 1 | 1 |
| 4 | 6 | – | – | – | – | 0 | 1 | 1 | **1** | **0** | **1** | 1 | 0 | 0 | 1 | 0 | $D_4$ | 0 | 1 |
| 5 | 5 | – | – | – | – | – | 0 | 1 | 1 | **1** | **0** | **1** | 1 | 0 | 0 | 1 | $D_5$ | 0 | 0 |
| 6 | 4 | – | – | – | – | – | – | 0 | 1 | 1 | **1** | **0** | **1** | 1 | 0 | 0 | $D_6$ | 1 | 0 |
| 7 | 3 | – | – | – | – | – | – | – | 0 | 1 | 1 | **1** | **0** | **1** | 1 | 0 | $\pi_1$ | 0 | 1 |
| 8 | 2 | – | – | – | – | – | – | – | – | 0 | 1 | 1 | **1** | **0** | **1** | 1 | $D_7$ | 0 → | 0 |
| 9 | 1 | – | – | – | – | – | – | – | – | – | 0 | 1 | 1 | **1** | **0** | **1** | $D_8$ | 1 → | 1 |
| | | "CORRECTING COMMAND" | | | | | | – | – | – | 0 | 1 | 1 | 0 | 1 | 0 | | | |
| 10 | 0 | – | – | – | – | – | – | – | – | – | – | 0 | 1 | 1 | 0 | 1 | $D_9$ | 0 → | 0 |
| 11 | | – | – | – | – | – | – | – | – | – | – | – | 0 | 1 | 1 | 0 | $\pi_2$ | 1 | |
| 12 | | – | – | – | – | – | – | – | – | – | – | – | – | 0 | 1 | 1 | $P_4$ | 0 | |
| 13 | | – | – | – | – | – | – | – | – | – | – | – | – | – | 0 | 1 | $P_1$ | 1 | |
| 14 | | – | – | – | – | – | – | – | – | – | – | – | – | – | – | 0 | $P_2$ | 1 | |
| 15 | | – | – | – | – | – | – | – | – | – | – | – | – | – | – | – | $P_3$ | 0 | |

United States Patent Office 3,213,426
Patented Oct. 19, 1965

3,213,426
ERROR CORRECTING SYSTEM

Constantin M. Melas, Saratoga, Calif., assignor to International Business Machines Corporation, New York, N.Y., a corporation of New York Filed Sept. 25, 1959, Ser. No. 842,272
14 Claims. (Cl. 340—172.5)

This invention relates in general to systems for detecting, locating and correcting errors in binary coded information, and, in particular, to a system for detecting, locating and correcting $2^{K_2}$ types of related errors in an information code group having N bit positions consisting of $K_1+K_2$ parity bit positions and M data positions where $N=2^{K_1}-1$ and $M=N-(K_1+K_2)$.

Various arrangements have been suggested in the prior art for checking coded information which has been translated between two points. These arrangements may be classified generally as either error detecting arrangements or error correcting arrangements. An example of an error detecting arrangement is the now well known parity check arrangement in which a parity bit position is added to the data bit positions of a binary code group. In this arrangement the binary value of the parity bit is chosen so that each code group has an even number of binary 1 bits. A similar known arrangement employs the same concept except that the value of the parity bit is chosen so as to provide an odd number of binary 1 bits in each code group. Such arrangements are, of course, limited to the function of merely detecting the presence of an odd number of errors. They cannot detect an even number of errors, and they cannot locate or correct any errors.

An example of an error correcting system known in the prior art is represented by the system disclosed by Hamming, et al. in U.S. Reissue 23,601 (U.S. 2,552,629). The theory of the Hamming code for single error correction may be readily understood by an analysis of the so-called parity check table. A parity check table corresponding to Table 2 in the above-mentioned reissued patent is reproduced below for convenience.

*Table 1*

| Parity bit | Locator subword | $k_1$ (1) | $k_2$ (2) | $k_3$ (3) | $D_1$ (4) | $D_2$ (5) | $D_3$ (6) | $D_4$ (7) |
|---|---|---|---|---|---|---|---|---|
| | | Code group position | | | | | | |
| 1 | $k_1$ | X | | | X | X | | X |
| 2 | $k_2$ | | X | | X | | X | X |
| 3 | $k_3$ | | | X | | X | X | X |

In the example represented by the above table a code group of 7 bit positions is assumed, $D_1$–$D_4$ representing data bit positions, and $k_1$–$k_3$ representing parity bit positions. This table is a convenient way to indicate that parity bit $k_1$ checks bit positions of the code group indicated by an X; that is, $k_1$ checks bit positions 1, 4, 5 and 7; parity bit $k_2$ checks bit positions 2, 4, 6 and 7; and parity bit $k_3$ checks bit positions 3, 5, 6 and 7.

If the code group of 7 bits is translated correctly, $k_1$–$k_3$ will all be 0 assuming an even parity check. However, if one bit of the translated code group is received in error the locator subword $k_1$–$k_3$ (referred to by Hamming as the parity subgroup) will not be all 0's, and, hence, a single error is readily detected. The particular bit position in which the detected error is located is indicated by the condition of the locator subword $k_1$–$k_3$.

The locator words and the respective bit positions which they indicate are in error are tabulated below for convenience, and correspond to Table 4 in the above mentioned reissued patent.

*Table 2*

| Error in bit position | Locator subword $k_3$ | $k_2$ | $k_1$ |
|---|---|---|---|
| $k_1$ | 0 | 0 | 1 |
| $k_2$ | 0 | 1 | 0 |
| $k_3$ | 1 | 0 | 0 |
| $D_1$ | 0 | 1 | 1 |
| $D_2$ | 1 | 0 | 1 |
| $D_3$ | 1 | 1 | 0 |
| $D_4$ | 1 | 1 | 1 |
| No errors | 0 | 0 | 0 |

The above table referred to as the locator subword table is based on the following reasoning and may be construed by reference to the parity check Table 1. To locate a particular bit position whose value has been received in error a reception parity check must be made over the same selected bit positions used in initially determining the value of each parity bit $k_1$–$k_3$. If a correct parity is received over the selected bit positions associated with each of the parity bits the locator subword $k_1$–$k_3$ is all 0's. If an error occurs in bit position 1, $k_1$ is affected and becomes a 1, while $k_2$ and $k_3$ are not affected since these parity bits do not check bit position 1. Hence, the locator subword for an error bit in bit position 1 is 100. Similarly, the locator subword for an error in bit position 2 is 010, and for an error in bit position 3, 001. An error in bit position 4 affects both $k_1$ and $k_2$, and hence the locator subword for an error in this bit position becomes 110. Similar reasoning may be employed to show that single errors in bit positions 5, 6 and 7 result in the locator subwords shown in Table 2. The obtaining of different locator subwords for indicating the bit position where a single error occurs is the basic concept on which the Hamming error-correcting system is based.

The prior art also suggests systems for detecting and/or correcting multiple errors. For example, Hamming in the reissued patent mentioned above further discloses a system which corrects single errors and detects double errors. The parity check table for the Hamming system which corrects single errors and detects double errors is shown in Table 3.

*Table 3*

| Parity bit | Locator subword | $k_1$ (1) | $k_2$ (2) | $k_3$ (3) | $D_1$ (4) | $D_2$ (5) | $D_3$ (6) | $D_4$ (7) | $k_4$ (8) |
|---|---|---|---|---|---|---|---|---|---|
| | | Code group position | | | | | | | |
| 1 | $k_1$ | X | | | X | X | | X | |
| 2 | $k_2$ | | X | | X | | X | X | |
| 3 | $k_3$ | | | X | | X | X | X | |
| 4 | $k_4$ | X | X | X | X | X | X | X | X |

*Table 3*

The parity check table shown in Table 3 is identical to the parity check table shown in Table 1, except for the addition of an 8th bit position to the code group, and the $k_4$ parity bit. Parity bits $k_1$, $k_2$ and $k_3$ check the same bit positions as in Table 1. The $k_4$ parity bit referred to as the "all check parity bit" checks each of the 8 bit positions.

The locator subwords (which correspond to Hamming's parity subgroups) for errors in particular bit positions are tabulated below in Table 4, and correspond to Table 6 of the reissued patent.

*Table 4*

| Error in bit position | Locator subword | | | |
|---|---|---|---|---|
| | $k_4$ | $k_3$ | $k_2$ | $k_1$ |
| $k_1$ | 1 | 0 | 0 | 1 |
| $k_2$ | 1 | 0 | 1 | 0 |
| $k_3$ | 1 | 1 | 0 | 0 |
| $D_1$ | 1 | 0 | 1 | 1 |
| $D_2$ | 1 | 1 | 0 | 1 |
| $D_3$ | 1 | 1 | 1 | 0 |
| $D_4$ | 1 | 1 | 1 | 1 |
| $k_4$ | 1 | 0 | 0 | 0 |
| No errors | 0 | (*) | (*) | (*) |

* 1, 2 or all of $k_1$, $k_2$ and $k_3$ will have a 1 value.

If there are no errors in a code group after it is translated, all of the parity bits $k_1$–$k_4$ will be satisfied and the locator subword will be 0000. When a single error occurs in any bit position of the code group two separate indications are obtained. First, the all check parity bit $k_4$ will not be satisfied, and therefore becomes a 1 indicating a single error. Second, the $k_1$–$k_3$ parity bits of the locator subword will indicate the location of the single error, the 000 value of $k_1$–$k_3$ now indicating an error in the eighth bit position of the code group. If, on the other hand, two errors have occurred the all check parity bit $k_4$ is satisfied, but at least one of the parity bits $k_1$, $k_2$ or $k_3$ will not be 0. Stated somewhat differently it can be determined by reference to Table 4 if a single error has been made by looking at the locator subword consisting of $k_1$–$k_4$ parity bits. If the locator subword is not all 0's a single or double error has been made. If the $k_4$ parity bit is a 1, this indicates a single error, and parity bits $k_1$–$k_3$ indicate the bit position in the code group where the single error has occurred. If, on the other hand, parity bit $k_4$ is 0 and one or more of the parity bits $k_1$–$k_3$ are 1, this indicates that two errors have been made, but no information is available from the locator subword table as to the location of the two errors. This system is therefore referred to as a single error correcting-double error detecting system (SEC-DED).

The prior are also discloses an arrangement for correcting single errors and double adjacent errors. A description of this code may be found in Technical Report No. 51 dated December 30, 1958, by N. M. Abramson entitled, "A Class of Systematic Codes for Non-Independent Errors," published by Stanford University, Stanford, California. In FIG. 1 of this report a parity check table is illustrated employing a code group of 7 bit positions consisting of 4 parity bit positions and 3 data bit positions. The table is reproduced below for convenience.

*Table 5*

| Parity Bit | Locator subword | Code group position | | | | | | |
|---|---|---|---|---|---|---|---|---|
| | | $D_1$ | $D_2$ | $D_3$ | $P_1$ | $P_2$ | $P_3$ | $P_0$ |
| | | 1 | 2 | 3 | 4 | 5 | 6 | 7 |
| 1 | $P_1$ | X | X | | X | | | |
| 2 | $P_2$ | | X | X | | X | | |
| 3 | $P_3$ | | | X | X | | X | |
| 4 | $P_0$ | X | X | X | X | X | X | X |

Table 5 is similar in form to the parity check table disclosed by Hamming, except for a change in notation. $P_1$–$P_3$ and $P_0$ correspond respectively to the parity bit notations $k_1$–$k_4$ employed by Hamming. The above table indicates that:

$P_1$ checks bit positions 1, 2 and 4 ($D_1$, $D_2$ and $P_1$)
$P_2$ checks bit positions 2, 3 and 5 ($D_2$, $D_3$ and $P_2$)
$P_3$ checks bit positions 3, 4 and 6 ($D_3$, $D_4$ and $P_3$)
$P_0$ checks bit positions 1 through 7 ($D_1$ through $P_0$).

The main distinguishing feature between the Abramson parity check table as shown in Table 5, and the parity check table disclosed by Hamming (Table 3) is that the bit positions checked by each parity bit $k_1$–$k_4$ in the Hamming table are arranged arbitrarily after two conditions are met. As explained by Hamming the parity check table for a single error correcting system satisfies two conditions. The first is that each bit position of the code group must be in a locator subword. The second condition is that each bit position must have a different combination of parity bits $k_1$–$k_4$. A different way of stating the second condition is that the locator subword $k_1$–$k_4$ (or $P_1$–$P_0$) for each bit position of the code group must be different.

In the parity check table (Table 5) disclosed by Abramson the two conditions of the Hamming parity check table are met, but a third condition must also be satisfied. This third condition is that the bit positions checked by a parity bit are determined in accordance with an $m$-sequence. The term $m$-sequence is known in the art and may be defined by the output signal of one stage of a maximal length binary shift register having R stages. An $m$-sequence is merely a unique series of 0's and 1's of $2^R-1$ binary digits arranged in a predetermined order. A true $m$-sequence satisfies the condition that:

$$a_{t+R}=\sum_{j=1}^{R} C_j a_{t+(j-1)} \quad (1)$$

where $2^R-1$ is the number of binary digits in the sequence before it repeats itself. The above equation may also be expressed as $$a_{t+R}=C_1a_t+C_2a_{t+1}+C_3a_{t+2}+C_Ra_{t+R-1} \quad (2)$$

where $C_1$–$C_R$ each represent a binary coefficient 0 or 1 determined from reference tables referred to as a "Table of Irreducible Polynomials Over Galois Field (2) Through Degree 19," by R. W. Marsh, a publication of the National Security Agency, dated October 24, 1957. Coefficients $C_1$–$C_R$ in effect determine the feedback path of the maximal length binary shift register.

The number of different $m$-sequences that are obtained from an R stage maximal length binary shift register is tabulated below:

*Table 6*

| Number of Stages | R=2 | 3 | 4 | 5 | 6 | 7 | 8 | 9 | 10 |
|---|---|---|---|---|---|---|---|---|---|
| Different $m$-sequences | 1 | 2 | 2 | 6 | 6 | 18 | 16 | 48 | 60 |

The number of different $m$-sequences obtained from an R-stage $m$-sequence generator also corresponds to the number of different groups of coefficients $C_1$–$C_R$ which are available for $m$-sequences.

From the above table it will be seen that two different $m$-sequences may be obtained from a 4-stage maximal length linear binary shift register. When $C_1$–$C_R$ correspond respectively to 1100, the following $m$-sequence is obtained:

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 0 | 1 | 0 | 1 | 1 | 1 | 1 | 0 | 0 | 0 | 1 | 0 | 0 | 1 | 1 |

When $C_1$–$C_R$ is 1001 the other $m$-sequence is obtained

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 0 | 1 | 0 | 1 | 1 | 0 | 0 | 1 | 0 | 0 | 0 | 1 | 1 | 1 | 1 |

With relation to the general Equation 1 for an $m$-sequence, the first sequence shown above is expressed specifically as $a_{t+4}=a_t+a_{t+1}$. In nonmathematical language this specific equation expresses the fact that the value of the fifth binary digit ($a_{t+4}$) = the mod. 2 sum of the values of the first binary digit ($a_t$) and second binary digit ($a_{t+1}$). For example, the fifth digit in the $m$-sequence (1) is obtained by binary addition (mod. 2) of the first digit (0) and the second digit (1). The following digits of the $m$-sequence are obtained in the same manner until $2^R-1$ (15) digits are obtained. The $m$-sequence then repeats itself.

The second $m$-sequence is obtained in a similar manner, but since the coefficients $C_1$–$C_R$ are different, 1001, the specific equation becomes $a_{t+4}=a_t+a_{t+3}$. In other words the value of first digit (0) plus the value of the fourth digit (1) will give the value of the fifth digit (1).

It was stated previously that the primary distinction between the systems of Hamming and Abramson was that the Abramson parity check table must satisfy the additional condition that the bit positions checked by a parity bit are determined by an $m$-sequence. The bit positions checked by parity bit $P_1$ of Abramson are shown below in relation to the $m$-sequence for a three-stage $m$-sequence generator and also in relation to an inverse $m$-sequence which is merely the complement of the true $m$-sequence.

| Bit position | 1 | 2 | 3 | 4 | 5 | 6 | 7 |
|---|---|---|---|---|---|---|---|
| | $D_1$ | $D_2$ | $D_3$ | $P_1$ | $P_2$ | $P_3$ | $P_0$ |
| $P_1$ | X | X | 0 | X | 0 | 0 | 0 |
| $m$-sequence for R=3 | 0 | 0 | 1 | 0 | 1 | 1 | 1 |
| Inverse $m$-sequence | 1 | 1 | 0 | 1 | 0 | 0 | 0 |

It will be noted that parity bit $P_1$ checks the bit positions indicated by the binary 1 bits of the inverse $m$-sequence. It will also be noted from Table 5 that parity bit $P_2$ checks bit positions corresponding to the same inverse $m$-sequence shifted to the right by one position relative to parity bit $P_1$ and that $P_3$ checks bit positions corresponding to the same inverse $m$-sequence shifted to the right by one bit position relative to parity bit $P_2$.

The fact that the bit positions checked follow an inverse $m$-sequence results in a fairly simple single error correction system in that the locator subwords may be readily stored in a 3-stage maximal length binary shift register. In addition to this simplification of the system the arrangement of the parity check table allows correction of double adjacent errors in that errors in successive pairs of bit positions (1 and 2, 2 and 3, 3 and 4, etc.) cause a group of locator subwords to be generated corresponding to the true $m$-sequence originally employed but which is shifted a fixed amount relative to the original $m$-sequence. This is shown in Table 7 below by representing the locator subwords for single errors and double errors in a 7 bit code group.

*Table 7*

| Error in bit position | 1 Locator subword | | | 2 Complement of locator subword | | | 3 Error in bit positions | 4 Locator subword | | |
|---|---|---|---|---|---|---|---|---|---|---|
| | $P_3$ | $P_2$ | $P_1$ | $P_3$ | $P_2$ | $P_1$ | | $P_3$ | $P_2$ | $P_1$ |
| 1 | 0 | 0 | 1 | 1 | 1 | 0 | 1–2 | 0 | 1 | 0 |
| 2 | 0 | 1 | 1 | 1 | 0 | 0 | 2–3 | 1 | 0 | 1 |
| 3 | 1 | 1 | 0 | 0 | 0 | 1 | 3–4 | 0 | 1 | 1 |
| 4 | 1 | 0 | 1 | 0 | 1 | 0 | 4–5 | 1 | 1 | 1 |
| 5 | 0 | 1 | 0 | 1 | 0 | 1 | 5–6 | 1 | 1 | 0 |
| 6 | 1 | 0 | 0 | 0 | 1 | 1 | 6–7 | 1 | 0 | 0 |
| 7 | 0 | 0 | 0 | 1 | 1 | 1 | 7–1 | 0 | 0 | 1 |

The locator subwords for double adjacent errors have been obtained by binary addition of the locator subwords for single errors in the affected bit positions. For example, the locator subword for a double adjacent error in pit positions 1 and 2 is 010, obtained by adding binarily the locator subword for a single error in bit position 1, (001) to the locator subword for a single error in pit position 2, (011). Table 7 shows that the complement of each locator subword for a single error corresponds to the locator subword for a double adjacent error starting in another bit position. For example, a single error in bit position 2 has the locator subword 011 ($P_3$, $P_2$, and $P_1$). The complement of this locator subword is 100 which corresponds to the locator subword 100 generated by a double adjacent error in bit positions 6 and 7. This is a shift of four positions between the two columns 2 and 4. Abramson shows that the four positional shift relationship is maintained for all the bit positions of the code group and this may be verified by Table 7. Since the locator subword tables for both single and double adjacent errors are related, they may be generated quite simply by the same maximal length binary shift register.

The process of double error correction merely involves first detecting between no error, a single error and a double adjacent error. One value of the all check parity bit $P_0$ indicates a single error, while the other value indicates either no error or a double adjacent error. However, the last ambiguity is resolved since the locator subword $P_1$–$P_3$ for the no error condition is unique (000) compared to the locator subwords $P_1$–$P_3$ for double errors, where $P_1$–$P_3$ include at least one binary 1.

Single and double adjacent errors may therefore be corrected by the Abramson system, and since it is a systematic approach it is quite simple to expand for code groups having any number of elements.

The present invention is directed to the detection, location and correction of multiple related errors. A group of different type errors are considered related if each of the errors results from the same error producing condition. For example, a noise burst signal which is 3 bit positions wide can cause four different types of related errors depending upon the value of the information bits subjected to the noise burst signal. For instance, if the values of the information bits affected are 000, respectively, it will be seen that a triple adjacent error 111 will result. Similarly, if the information bits affected are 100 a double adjacent error results. The noise burst signal causes each bit position which has a 0 value to change to a 1. It will therefore be seen that a noise burst signal 3 bit positions wide can produce the following four types of related errors; a signal error (1); a double adjacent error (11); a double nonadjacent error (101), and a triple adjacent error (111).

Likewise an interruption in the transmission of the code group during 3 bit positions caused, for example, by switching between telephone lines, also produces the same type of related errors, since the interruption in effect changes each bit position having a 1 value to a 0 value. Since a very large percentage of errors occur during the transmission of binary data are of the related type, a system which will correct all related errors is quite efficient.

The system of the present invention is characterized by the use of two distinct sets of parity bits to locate the error within the received code group and to determine the error type. One set of parity bits, referred to as the error type parity bits, is employed in determining the type of error; and the other set, referred to as locator parity bits, is employed in determining the location of the error. The bit positions checked by each locater partiy bit are determined in accordance with a first $m$-sequence, while the bit positions checked by one error type parity bit are determined by a second $m$-sequence. If $K_1$ is equal to the number of locator parity bits and $K_2$ is equal to the number of error type parity bits, $2^{K_2}$ types of related errors may be corrected in a code group of N bit positions consisting of M data bit positions and $K_1+K_2$ parity bit positions were $N=2^{K_1}-1$.

The basis on which the present system operates may be seen from the parity check table below and the tabulation of the locator subwords in Table 9 for each of the various types of errors which may be corrected.

*Table 8*

| | $D_1$ | $D_2$ | $D_3$ | $D_4$ | $D_5$ | $D_6$ | $\pi_2$ | $D_7$ | $D_8$ | $D_9$ | $\pi_1$ | $P_4$ | $P_1$ | $P_2$ | $P_3$ |
|---|---|---|---|---|---|---|---|---|---|---|---|---|---|---|---|
| $P_1$ | X | X | ----- | X | ----- | X | X | X | X | ----- | ----- | ----- | X | ----- | ----- |
| $P_3$ | ----- | X | X | ----- | X | ----- | X | X | X | X | ----- | ----- | ----- | X | ----- |
| $P_3$ | ----- | ----- | X | X | ----- | X | ----- | X | X | X | X | ----- | ----- | ----- | X |
| $P_4$ | X | ----- | ----- | X | X | ----- | X | ----- | X | X | X | X | ----- | ----- | ----- |
| $\pi_1$ | ----- | X | X | ----- | X | X | ----- | X | X | ----- | X | X | ----- | X | X |
| $\pi_2$ | X | ----- | X | X | ----- | X | X | ----- | X | X | ----- | X | X | ----- | X |

*Table 9*

| Error starting in bit | 9a 1 | | | | | | 9b 11 | | | | | | 9c 101 | | | | | | 9d 111 | | | | | |
|---|---|---|---|---|---|---|---|---|---|---|---|---|---|---|---|---|---|---|---|---|---|---|---|---|
| | $P_1$ | $P_2$ | $P_3$ | $P_4$ | $\pi_1$ | $\pi_2$ | $P_1$ | $P_2$ | $P_3$ | $P_4$ | $\pi_1$ | $\pi_2$ | $P_1$ | $P_2$ | $P_3$ | $P_4$ | $\pi_1$ | $\pi_2$ | $P_1$ | $P_2$ | $P_3$ | $P_4$ | $\pi_1$ | $\pi_2$ |
| 1 | 1 | 0 | 0 | 1 | 0 | 1 | 0 | 1 | 0 | 1 | 1 | 1 | 1 | 1 | 1 | 1 | 1 | 0 | 0 | 0 | 1 | 1 | 0 | 0 |
| 2 | 1 | 1 | 0 | 0 | 1 | 0 | 1 | 0 | 1 | 0 | 0 | 1 | 0 | 1 | 1 | 1 | 1 | 1 | 0 | 0 | 0 | 1 | 0 | 0 |
| 3 | 0 | 1 | 1 | 0 | 1 | 1 | 1 | 1 | 0 | 1 | 1 | 0 | 0 | 0 | 1 | 1 | 0 | 1 | 1 | 0 | 0 | 0 | 0 | 0 |
| 4 | 1 | 0 | 1 | 1 | 0 | 1 | 1 | 1 | 1 | 0 | 1 | 1 | 0 | 0 | 0 | 1 | 1 | 0 | 0 | 1 | 0 | 0 | 0 | 0 |
| 5 | 0 | 1 | 0 | 1 | 1 | 0 | 1 | 1 | 1 | 1 | 0 | 1 | 1 | 0 | 0 | 0 | 1 | 1 | 0 | 0 | 1 | 0 | 0 | 0 |
| 6 | 1 | 0 | 1 | 0 | 1 | 1 | 0 | 1 | 1 | 1 | 1 | 0 | 0 | 1 | 0 | 0 | 0 | 1 | 1 | 0 | 0 | 1 | 0 | 0 |
| 7 | 1 | 1 | 0 | 1 | 0 | 1 | 0 | 0 | 1 | 1 | 1 | 1 | 0 | 0 | 1 | 0 | 1 | 0 | 1 | 1 | 0 | 0 | 0 | 0 |
| 8 | 1 | 1 | 1 | 0 | 1 | 0 | 0 | 0 | 0 | 1 | 0 | 1 | 1 | 0 | 0 | 1 | 1 | 1 | 0 | 1 | 1 | 0 | 0 | 0 |
| 9 | 1 | 1 | 1 | 1 | 1 | 1 | 1 | 0 | 0 | 0 | 1 | 0 | 1 | 1 | 0 | 0 | 0 | 1 | 1 | 0 | 1 | 1 | 0 | 0 |
| 10 | 0 | 1 | 1 | 1 | 0 | 1 | 0 | 1 | 0 | 0 | 1 | 1 | 0 | 1 | 1 | 0 | 1 | 0 | 0 | 1 | 0 | 1 | 0 | 0 |
| 11 | 0 | 0 | 1 | 1 | 1 | 0 | 0 | 0 | 1 | 0 | 0 | 1 | 1 | 0 | 1 | 1 | 1 | 1 | 1 | 0 | 1 | 0 | 0 | 0 |
| 12 | 0 | 0 | 0 | 1 | 1 | 1 | 1 | 0 | 0 | 1 | 1 | 0 | 0 | 1 | 0 | 1 | 0 | 1 | 1 | 1 | 0 | 1 | 0 | 0 |
| 13 | 1 | 0 | 0 | 0 | 0 | 1 | 1 | 1 | 0 | 0 | 1 | 1 | 1 | 0 | 1 | 0 | 1 | 0 | 1 | 1 | 1 | 0 | 0 | 0 |
| 14 | 0 | 1 | 0 | 0 | 1 | 0 | 0 | 1 | 1 | 0 | 0 | 1 | 1 | 1 | 0 | 1 | 1 | 1 | 1 | 1 | 1 | 1 | 0 | 0 |
| 15 | 0 | 0 | 1 | 0 | 1 | 1 | 1 | 0 | 1 | 1 | 1 | 0 | 1 | 1 | 1 | 0 | 0 | 1 | 0 | 1 | 1 | 1 | 0 | 0 |

Table 9*a* represents the locator subwords for single errors. Tables 9*b*–9*d* represent the locator subwords for double adjacent errors, double nonadjacent errors, and triple adjacent errors, respectively. The locator subword Tables 9*b*–9*d* are obtained from the locator subword Table 9*a* for single errors by mod. 2 addition of the locator subwords for the bit positions in error. For example, the locator subword for a double adjacent error starting in bit position 1, as shown in Table 9*b* is 010111. This is obtained by binary addition of the locator subword for a single error in bit position 1 (which is 100101) to the locator subword for a single error in bit position 2, (which is 110010). The result is 010111, which corresponds to the first locator subword in Table 9*b*. Similarly, the locator subwords for a double nonadjacent error starting in bit position 1 is obtained by binary addition of the locator subword for a single error in bit positions 1 and 3 ($100101 \oplus 011011 = 111110$).

It will be seen from Table 9 that the locator subword Tables 9*b*, 9*c* and 9*d* are merely shifted versions of the single error locator subword Table 9*a* and that each table is shifted a different amount.

If one of the four types of related errors occurs in any of the fifteen bit positions of the code group, it is therefore possible to determine its location from Table 9, since if no error occurs the six parity bits $P_1$—$\pi_2$ will all be 0. If $P_1$—$\pi_2$ are not all 0's the particular sequence of 0's and 1's, when compared with Table 9, will indicate the error type and the bit position where the error begins.

It is therefore an object of the present invention to provide an improved system for checking the accuracy of binary data which is translated between two points.

Another object of the present invention is to provide a system for correcting multiple related errors in a translated code group.

A further object of the present invention is to provide an error correcting system in which the number of parity bits employed to correct a predetermined number of different errors is kept to a minimum.

A still further object of the present invention is to provide an improved method for correcting various types of related errors in a binary coded word.

The foregoing and other objects, features and advantages of the invention will be apparent from the following more particular description of a preferred embodiment of the invention, as illustrated in the accompanying drawings.

In the drawings:

FIGS. 1*a* and 1*b* are block diagrams illustrating diagrammatically an error correcting system embodying the present invention;

FIG. 3 is a chart employed in explaining the operation of the encoder shown in FIG. 2;

FIG. 4 illustrates a parity check table of the particular example chosen to illustrate the operation of the system and corresponds to Table 8 in the specification;

Figures 5, 5A, 5B:
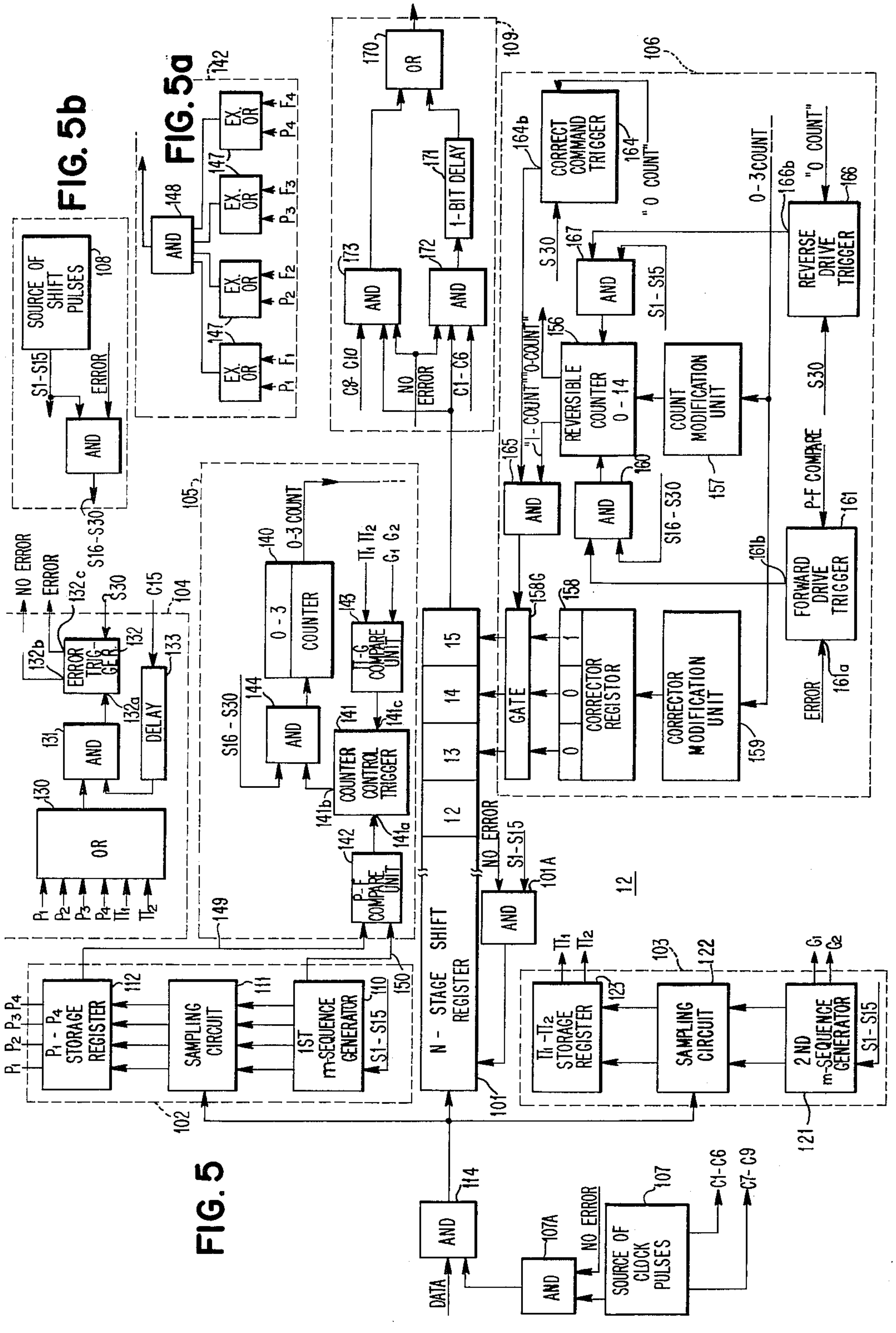
FIG. 5 is a schematic view illustrating the decoder shown in FIG. 1*b*.

FIGS. 5*a* and 5*b* are views illustrating components of the decoder shown in FIG. 5; and FIGS. 6–6*c* are charts employed in explaining the operation of the decoder.

Figure 1A:
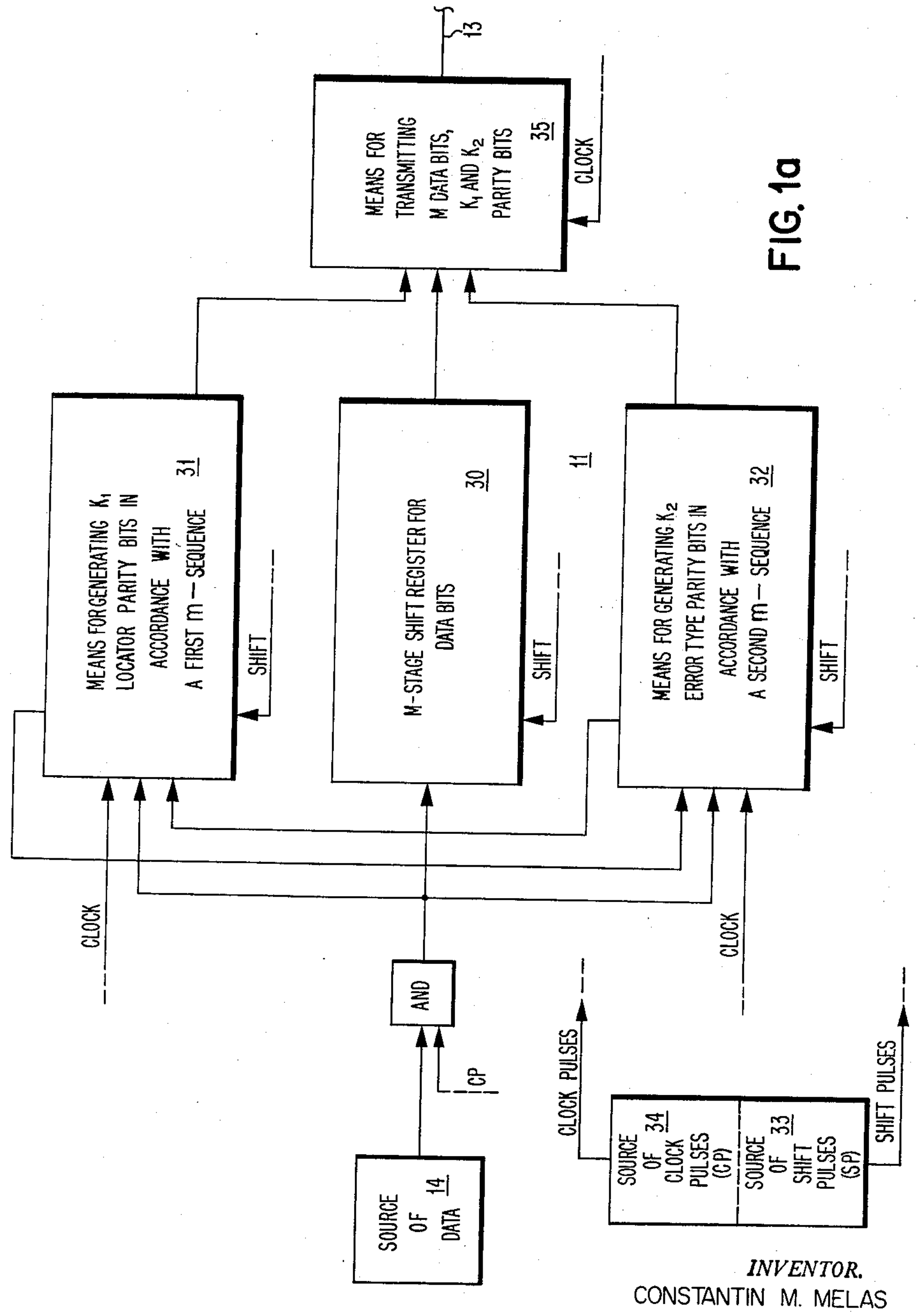
Figure 1B:
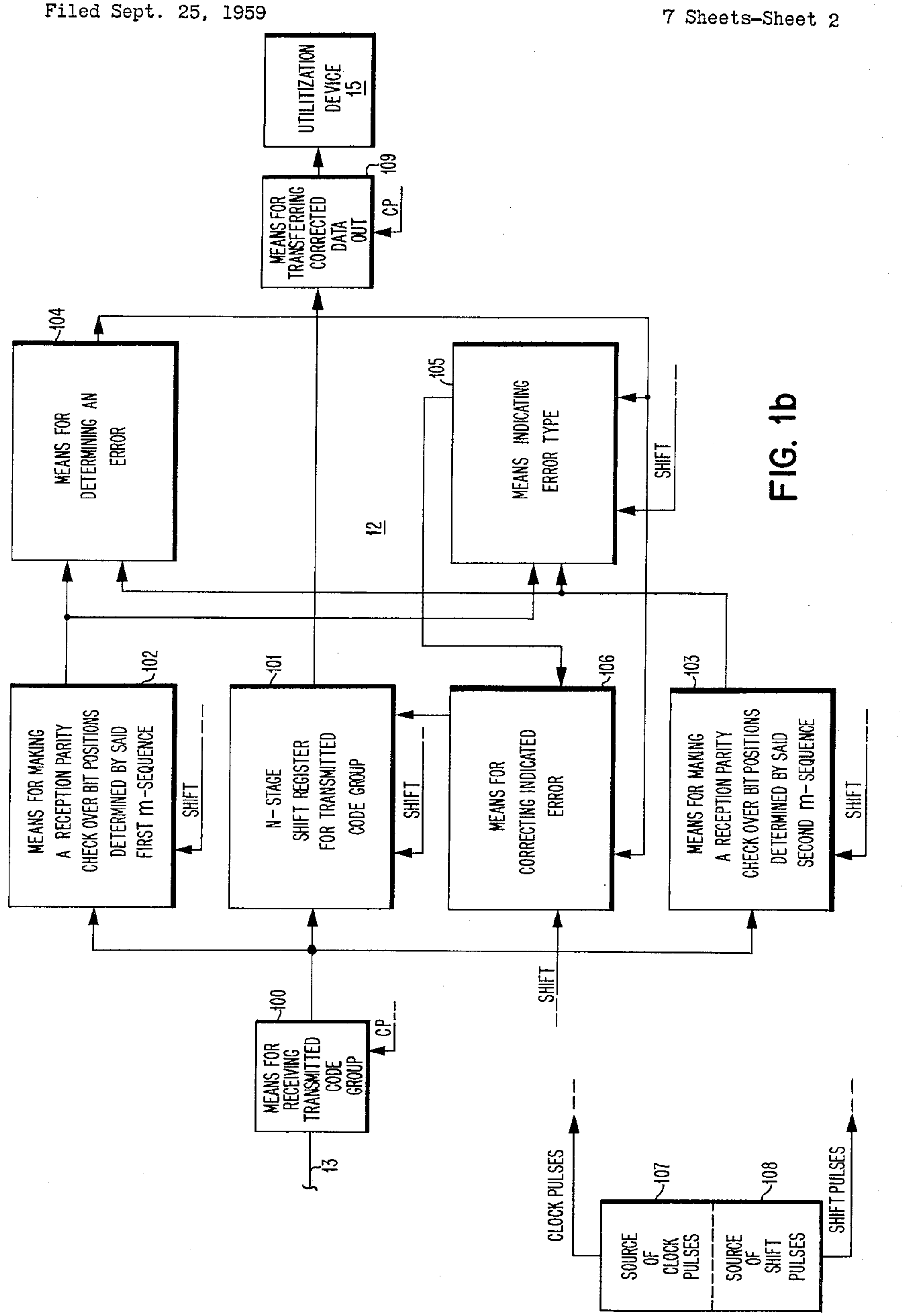

Referring to the drawings, and particularly to FIGS. 1*a* and 1*b*, the error correcting system comprises generally an encoder 11 shown in FIG. 1*a*, and a decoder 12 shown in FIG. 1*b*, which are interconnected in data translating relationship by some suitable data translating means 13. In practice the input of the encoder is adapted to be connected to a source 14 of binary coded data, while the output of the decoder is adapted to be connected to a device 15 which utilizes the data translated and checked by the system.

The data translating means 13 interconnecting the encoder 11 and decoder 12 may take several forms depending on the particular application involved. For example, the translating means 13 may represent either a commercial telephone link or a radio telephone link connecting one of a plurality of remote input stations to a centrally located data processing center in which event the encoder 11 of the error correcting system is located in proximity with the remote input station and the decoder 12 is associated with the central data processing center. On the other hand, the data source 14 and the utilization device 15 may both be physically located in the same data processing unit, in which event the data translating means 13 interconnecting the encoder 11 and decoder 12 would employ in its simplest form a single conductor.

As shown in FIG. 1*a*, the encoder portion of the error correcting system functions generally to transmit a series of code groups each having N bit positions consisting of $K_1$ locator parity bit positions, $K_2$ error type parity bit positions, and M data bit positions where $$N=2^{K_1}-1$$

and where the bit positions to be checked by each of the locator parity bits are determined by a first *m*-sequence, and the bit positions checked by the error type parity bits are determined by a second *m*-sequence.

The encoder 11 in its simplest form may therefore be considered as means for transmitting to the decoder 12, a code group having N bit positions consisting of $K_1$ locator parity bit positions, $K_2$ error type parity bit positions and M data bit positions, each locator parity bit having a binary value determined by the mod. 2 sum of the binary values of subgroups of said N bit positions selected in accordance with a first *m*-sequence, and each transmitted error type parity bit having a binary value determined by the mod. 2 sum of the binary values of different subgroups of said N bit positions selected in accordance with a second *m*-sequence.

The encoder as shown in FIG. 1*a* operates to transmit a code group having fifteen bit positions consisting of four locator parity bit positions, two error type bit positions and nine data bit positions. The encoder as shown operates in a serial type manner although parallel type operation is also possible.

The encoder as shown in FIG. 1*a* comprises generally a conventional shift register 30, means 31 for generating four locator parity bits in accordance with a first *m*-sequence, means 32 for generating two error type parity bits in accordance with a second *m*-sequence, a source 33 of shift pulses, a source 34 of clock pulses, and means 35 for sequentially transmitting the data bits, the locator parity bits and the error-type parity bits in a predetermined order.

Figure 2:
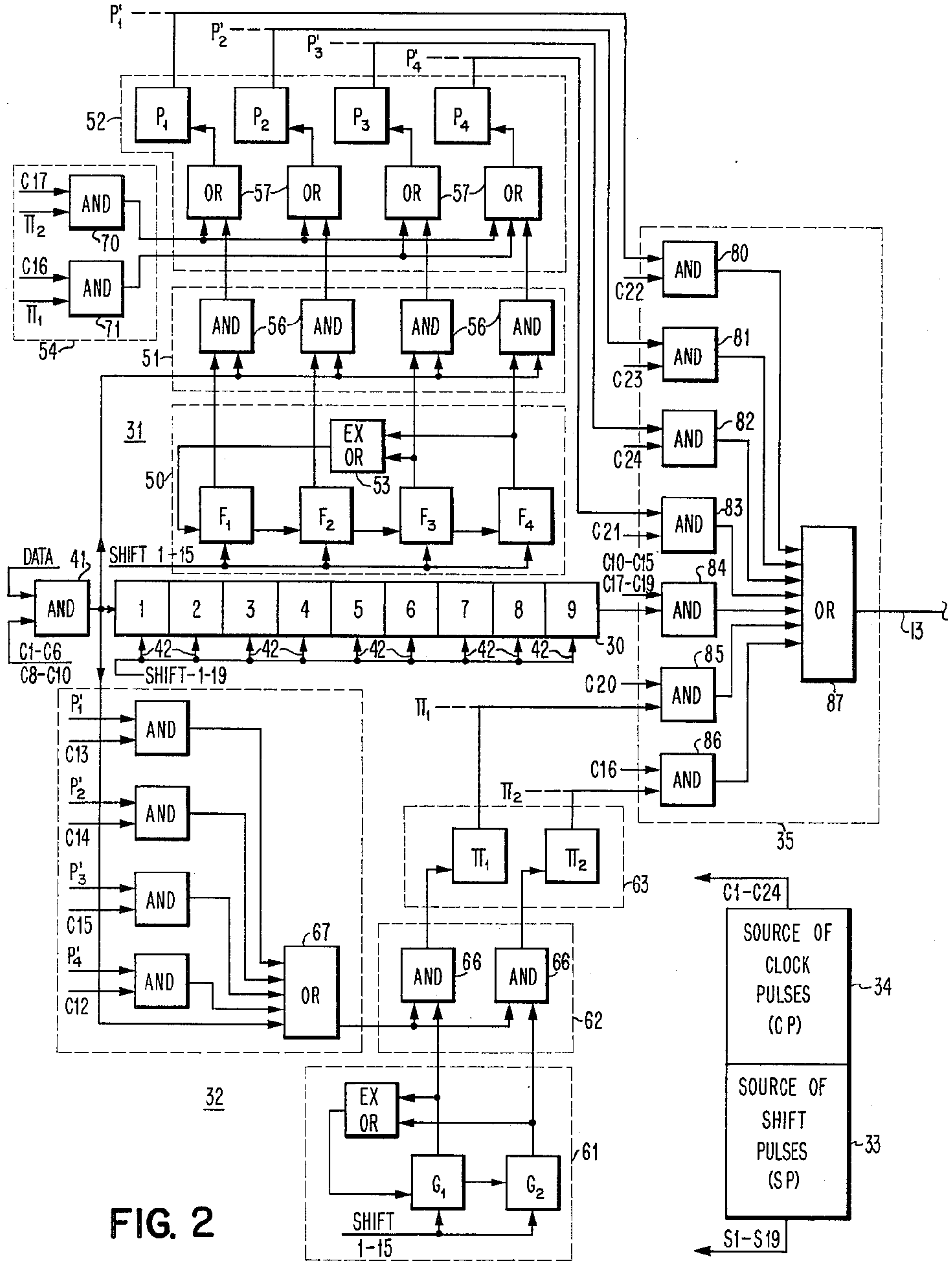
FIG. 2 is a schematic circuit illustrating the encoder employed in FIG. 1.

FIG. 2 illustrates the details of the encoder 11 shown in block form in FIG. 1*a*. While FIG. 2 may also be considered a block diagram, each of the blocks shown represent basic circuits well known in the art. Since the specific details of each of the blocks shown in FIG. 2 form no part of the present invention they are not shown in the drawings or described in the specification. Reference may be had to many of the standard electronic texts for the details and operation of the specific circuits shown. It is believed that FIG. 2 illustrates the organization of the various functional components of the encoder more clearly and allows a clearer understanding of the invention than if the specific circuits were illustrated.

Referring to FIG. 2, the shift register 30 as illustrated comprises nine stages, 30–1 through 30–9, and is therefore capable of temporarily storing up to nine separate bits at any one time. The source of data signals 14 is connected to the first stage 30–1 of the shift register 30 through an input AND gate 41 which has its other terminal connected to the source 34 of clock pulses. Each stage 30–1 through 30–9 of the register 30 has a shift input terminal 42 connected to the source 33 of shift pulses. The shift pulses and the clock pulses have substantially the same frequency but are displaced in phase an amount to allow entry of a data bit between shift pulses. Any suitable source of clock pulses may be employed. Similarly, any suitable source of shift pulses may be employed. In practice the shift pulses may be obtained from the clock pulse generator by merely delaying one group of signals relative to the other for a predetermined time.

The nine bits of data to be transmitted to the decoder are supplied to the shift register 30 under the control of clock pulses 1–6 and 8–10. The contents of the shift register 30 is shifted to the right under the control of shift pulses 1–19. No data is supplied to the shift register 30 during clock pulse time 7 in order to reserve the seventh bit position of the transmitted code group for the $\pi_2$ error-type parity digit.

The status of the shift register at the various clock times may be seen by reference to the chart of FIG. 3 which is employed in explaining the operation of the encoder.

The means 31 for generating the locator parity bits comprises an *m*-sequence generator 50, a sampling circuit 51 and a four-stage storage register 52. The *m*-sequence generator 50, as shown, is similar to a conventional four-stage shift register except that a feed-back path is established through the "exclusive OR" circuit 53 from the output of the third and fourth stages $F_3$ and $F_4$ back to the first stage $F_1$. The output of each stage F of the illustrated *m*-sequence generator provides the same *m*-sequences. However, the *m*-sequences are shifted relative to each other by one position. The *m*-sequences may be seen in FIG. 3, where the output of each stage $F_1$–$F_4$ of the *m*-sequence generator is tabulated. It will be noted that each of the columns $F_1$–$F_4$ define the same fifteen digit *m*-sequence. However, the *m*-sequence in columns $F_2$, $F_3$ and $F_4$ are shifted relative to the *m*-sequence in column $F_1$. The particular *m*-sequence illustrated may be definied by the equation $a_t+a_{t+1}=a_{t+4}$.

The output of the *m*-sequence generator is supplied to the sampling circuit 51. The output signal from generator 50 at the end of any shift pulse may be considered as a four bit sampling signal which conditions the sampling circuit 51.

The sampling circuit 51 comprises four separate AND gates 56. Each AND gate 56 has one terminal connected to the data source through AND gate 41. The other terminal of each AND gate 56 is connected respectively to the outputs of the four stages $F_1$–$F_4$ of the *m*-sequence generator 50. When the output signal of a particular stage F is in a "high" condition the associated AND gate 56 is conditioned allowing a data bit D to be supplied to the storage register 52.

The function of the *m*-sequence signals from the output of the four stages of the *m*-sequence generator may be seen by reference to the parity check table of FIG. 4 constructed for the illustrated example. It will be seen that the horizontal rows in FIG. 4 designated $P_1$–$P_4$ are identical to the vertical columns $F_1$–$F_4$, respectively, of FIG. 3 if an X is substituted for a 1 and a blank for a 0. As explained previously in connection with parity check tables, the X indicates that the particular parity bit $P_1$ checks the bit positions marked by the X ($D_1$, $D_2$ $D_4$, $D_6$, $\pi_2$, $D_7$, $D_8$ and itself). The output signal of the $F_1$ stage of the *m*-sequence generator 50 performs this selective sampling operation. The output signals of the other stages $F_2$–$F_4$ provide similar selective sampling operations.

The locator parity bit storage register 52, as shown, comprises four separate one-stage binary counters. In practice each stage may represent a conventional trigger or flip-flop which changes back and forth between states in response to an input pulse from the sampling circuit 51. Each of the stages is, in effect, therefore a simple binary counter which keeps count of the number of 1 bits in the bit positions determined by the sampling signal from the *m*-sequence generator 50.

Since the locator parity bits $P_1$–$P_4$ check the bit positions assigned to the error type parity bits $\pi_1$ and $\pi_2$, the states of the locator parity bits $P_1$–$P_4$ after checking the data bits are designated $P'_1$–$P'_4$ in the table of FIG. 3, and are modified after the error type parity bits $\pi_1$–$\pi_2$ are computed. The means 54 for modifying the states of these transistory locator parity bits $P'_1$–$P'_4$ under the control of the final error-type parity bits $\pi_1$–$\pi_2$ is described further on in the specification after the description of the means 32 for generating the error type parity bits.

As shown in FIG. 2 the means 32 for obtaining the error type parity bits $\pi_1$–$\pi_2$ is similar to the means 31 employed in obtaining the locator parity bits $P_1$–$P_4$. Means 32 comprises an *m*-sequence generator 61, a sampling circuit 62, and an error type parity bit storage register 63. The *m*-sequence generator 61 has two stages $G_1$ and $G_2$ and operates similarly to generator 50. The *m*-sequence generator 61 provides the *m*-sequence tabulated in FIG. 3 in columns $G_1$–$G_2$ This sequence is only three bits long and then repeats itself.

The sampling circuit 62 is similar to sampling circuit 51 and comprises a pair of AND gates 66. Each AND gate 66 has one terminal connected to an OR circuit 67 which is supplied with data bits from the input AND gate 41 and with the transistory locator parity bits $P'_1$–$P'_4$. The other terminals of AND gate 66 are connected respectively to the output terminals of the two stages $G_1$ and $G_2$ of the *m*-sequence generator 61. AND gates 66 are therefore conditioned by the selective sampling signals of the *m*-sequence generator 61.

The outputs of the AND gate 66 are connected to the respective stage $\pi_1$–$\pi_2$ of the error type parity bit storage register 63 which functions in the same manner as the storage register 52. That is, each stage $\pi_1$ and $\pi_2$ of the storage register 63 keeps count of the number of binary 1 bits in the bit position of the code group selected by the *m*-sequence sampling signals from the *m*-sequence generator 61.

When the final error type parity bits have been obtained, they are employed to modify the transitory locator parity bits $P_1'$–$P'_4$. It can be seen from the parity check table in FIG. 4 that the $\pi_2$ bit position is checked by $P_1$, $P_2$, and $P_4$, therefore, the transitory locator parity bits $P'_1$, $P'_2$, and $P'_4$ are modified by adding 1 to each of the party bits if $\pi_2$ as finally computed is a 1. The means 54 for modifying $P'_1$, $P'_2$ and $P'_4$ under the control of the value of $\pi_2$ parity bit comprises an AND gate 70 having an input terminal connected to the output of the $\pi_2$ stage of the storage register 63 and the other input terminal connected to the clock pulse source 34. The output of the AND gate 70 is connected to the respective inputs of the $P_1$, $P_2$ and $P_4$ stages of the locator parity storage register 52 through the OR circuits 57.

Similarly, it will be seen in the parity check table of FIG. 4 that the $\pi_1$, bit position of the code group is checked by locator parity bits $P_3$ and $P_4$. Therefore, the transitory parity bits $P'_3$ and $P'_4$ are also modified by means 54 by adding 1 to both of these bits if the final value of the $\pi_1$ parity bit is a 1. The means 54 for modifying $P'_3$ and $P'_4$ under the control of the $\pi_1$ parity bit includes AND gate 71 which has one input terminal connected to the $\pi_1$ stage of the storage register 63 and the other input terminal connected to the clock pulse source 34. The output of the AND gate 71 is connected to respective inputs of the $P_3$ and $P_4$ stages of the storage register 52 through the OR circuits 57.

The means 35 for transmitting the data bits $D_1$–$D_9$, the final locator parity bits $P_1$–$P_4$ and the error-type parity bits $\pi_1$ and $\pi_2$ in a predetermined order as shown in FIG. 2 comprise a series of seven AND gates 80–86 and a seven terminal OR gate 87. AND gate 84 has one input terminal connected to the output of the last stage 30–9 of the shift register 30, while the other terminal is connected to the clock pulse source 34 and receives clock pulses 10–15 and 17–19. Each of the AND gates 80–83 has one terminal connected to the respective output terminals of the locator parity bit storage register 52, while each of the AND gates 85 and 86 has one terminal connected to the respective output terminals of the error-type parity bit storage register 63. The other terminals of the AND gates 80–83, and 85 and 86 are connected to the source 34 of clock pulses and each receives a particular clock pulse. These particular clock pulses supplied to the seven AND gates are designated on the respective input lines thereof.

Before proceeding with the detailed description of the decoder, an example of the encoding operation will be explained.

The operation of the encoder shown in FIG. 2 may be seen by reference to FIG. 3. It will be assumed that a word consisting of nine data bit positions $D_1$–$D_9$ is to be encoded and transmitted to the decoder of FIG. 1*b* along with four locator parity bits and two error-type parity bits. The word to be encoded is shown in FIG. 3 along with the state of the *m*-sequence generators and the parity bit registers at the start of the encoding operation. As shown the condition of the four stages $F_1$–$F_4$ of the first *m*-sequence generator 50 prior to starting is 0010 respectively while the condition of the two stages $G_1$ and $G_2$ of the second *m*-sequence generator 61 prior to starting is 11 respectively. The parity bit storage registers 52 and 63 and the shift register 30 are set to all 0's. Clock pulses C1–C6 and C8–C10 are supplied to the input AND gate 41 while the *m*-sequence generators 50 and 61 are supplied with shift pulses 1–15. Shift register 30 is supplied with shift pulses S1–S19.

The condition of the first *m*-sequence generator 50 at the end of the first shift pulse, as shown in FIG. 3 on the line containing the first shift pulse, is 1001. As a result the first and fourth AND gates 56 of the sampling unit 51 are conditioned, which allows the first data bit $D_1$ to be supplied to the $P_1$ and $P_4$ stages of the storage register 52 during the first clock pulse time C1.

The condition of the $G_1$ and $G_2$ stages of the second *m*-sequence generator 61 at the end of the first shift pulse is also shown in FIG. 3. As shown $G_1$ is 0 and $G_2$ is 1, which allows the first data bit to be supplied to only the $\pi_2$ stage of the storage register 63 during the first clock pulse time C1, since only right hand AND gate 66 of the sampling circuit 62 is conditioned.

The first data bit $D_1$ is a 0 and, hence, $P_1$–$P_4$ and $\pi_1$ and $\pi_2$ stages of the registers 52 and 63 remain all 0's, and the first stage 30–1 of the shift register contains a 0. The second shift pulse applied to the *m*-sequence generator changes the $F_1$–$F_4$ stages of the *m*-sequence generator 50 to 1100 and $G_1$ and $G_2$ stages of the second *m*-sequence generator 61 to 10. The second shift pulse also transfers the condition of stage 30–1 of the shift register 30 to stage 30–2. A second data pulse $D_2$, which is a 1, is therefore applied to the shift register, the $P_1$ and $P_2$ stages of the locator storage register, and to the $G_1$ stage of the error-type storage register 63 during the second clock pulse time.

The above operation is continued until the code group of nine data bits has been encoded to provide a code group of fifteen bits. During clock pulse times C7 and C11 no data is supplied to the shift register 30 or to the sampling circuits 51 and 62 in order to allow for insertion of the error-type party bits $\pi_1$ and $\pi_2$. During clock times C12–C15 the transitory locator parity bits $P'_1$–$P'_4$ are supplied to the sampling circuit 62. The transitory locator parity bits $P'_3$–$P'_4$ are modified under the control of the finally generated $\pi_1$ error-type parity bit during clock pulse time C16 and the $P'_1$, $P'_2$ and $P'_4$ transitory parity bits are modified under the control of the $\pi_2$ error-type parity bit during clock time C17.

Clock pulses C10–C24 are employed to clock the data bits from the last stage of the shift register 30–9 and from the parity bit storage registers 52 and 63 in a prearranged order in accordance with the parity check table. The encoded word is then transmitted to the decoder in any suitable manner. The next word to be encoded may then be supplied to the encoder and the cycle repeated.

The decoder 12 for the error correcting system, as shown diagrammatically in FIG. 1*b*, comprises generally means 100 including an N stage shift register 101 for receiving the transmitted code groups, means 102 for making a reception parity check over bit positions determined by the first *m*-sequence, means 103 for making a reception parity check over bit positions determined by the second $m$-sequence, means 104 jointly under the control of the generated reception parity bits for detecting if an error occurred, means 105 for indicating the type of error detected, and means 106 for correcting the indicated error. A source 107 of clock pulses and a source 108 of shift pulses may also be provided in the decoder 12.

FIG. 5 illustrates schematically the decoder shown in block form in FIG. 1*b*. The means 102 for making a reception parity check over bit positions determined by said first $m$-sequence comprises a first $m$-sequence generator 110, a sampling circuit 111, and a four-stage register 112. The means 103 for making a reception parity check over bit positions determined by the second $m$-sequence, as shown in FIG. 5, comprises an $m$-sequence generator 121, a sampling circuit 122, and a two-stage storage register 123. The sampling circuits 111 and 122 are identical to the sampling circuits 51 and 62, respectively, of the encoder 11, and are supplied with the received signals through the decoder input AND gate 114, which is conditioned during clock pulse times C1–C15 provided the previous word has been received correctly. The decoder input AND gate 114 may, in practice, comprise the output of a data signal receiver.

Each stage of the storage registers 112 and 123 therefore counts the number of binary 1's in the bit positions determined by the respective $m$-sequences. The storage registers 112 and 123 will contain all 0's if the fifteen bit code group is received correctly. If an error has occurred at least one of the stages $P_1$–$P_4$ or $\pi_1$ or $\pi_2$ will contain a 1. The output of the decoder input AND gate 114 is also connected to the N stage shift register 101, which is supplied with shift pulses S1–S15 through an AND gate 101A to shift the received code group into register 101 from left to right. The other terminal of AND gate 101A is supplied with a no-error signal which conditions AND gate 101A.

The means 104 for providing an error signal if an error has occurred comprises in this instance a six terminal OR circuit 130, an AND gate 131, an error trigger 132 and a delay unit 133. The respective outputs of the stages $P_1$–$P_4$ of the locator parity bit storage register 112 and the stages $\pi_1$ and $\pi_2$ of the error type storage register 123 are connected to the inputs of OR circuit 130 whose output is connected to one input terminal of AND gate 131. AND gate 131 is conditioned by a delayed clock pulse C15 supplied to the other input terminal through delay unit 133. The output terminal of AND gate 131 is connected to one input terminal **132*a* of the error trigger 132. Error trigger 132 has one output terminal 132*b* which is normally high indicating no error, and a second output terminal 132*c*, which is normally low indicating an error. An error pulse applied to the input terminal 132*a* from the OR circuit 130 causes the output terminal 132*b* to change from a high to a low state. The error trigger 132** is reset by an S30 pulse after the type of error detected has been determined.

Means 105 for indicating the type of error detected, as shown in FIG. 5, comprises a counter 140, a counter control trigger 141, a P–F compare unit 142 and a $\pi$–G compare unit 143. The counter 140 is a conventional binary counter which counts from 0–3 in response to driving pulses S16–S30. Driving pulses S16–S30 are supplied to the counter through an AND gate 144, which is conditioned under the control of the counter control trigger 141. Driving pulses S16–S30 correspond to shift pulses S1–S15 except that they occur after an error has been detected. Shift pulses S16–S30 are obtained from the source of shift pulses 108 by gating shift pulses S1–S15 with an error signal from error trigger 132.

The output terminal **141*b* of the counter control trigger 141 is normally low. A P–F compare signal applied to the input terminal 141*a* changes the state of the trigger 141 causing the output terminal 141*b* to change to a high state, thereby conditioning the AND gate 144. A $\pi$–G compare signal applied to the input terminal 141*c* resets the trigger 141 to its initial state where output terminal 141*b*** is low.

The P–F compare unit 142 for supplying the P–F compare signal to the control trigger 141 is shown in FIG. 5*a*. In this instance the P–F compare unit comprises four "exclusive OR" circuits 147 and a four-terminal AND gate 148. Each "exclusive OR" circuit 147 is supplied with an output signal from the corresponding stages $P_1$–$P_4$ of the locator parity bit-register 112 and $F_1$–$F_4$ stages of the $m$-sequence generator 110. The function of an "exclusive OR" circuit is to provide an output signal only when the two input signals are the same. AND gate 148 thereby functions to supply the P–F compare signal to turn On the counter control trigger 141 when the condition of the locator storage register 112 and the $m$-sequence generator 110 are identical.

The output line 149 from the storage register 112 and the output line 150 from the $m$-sequence generator 110 each represent four lines from the respective stages of the register and the $m$-sequence generator to the comparing unit 142.

The $\pi$–G compare unit 143 is similar to the P–F compare unit, and, hence, is not shown in detail in the drawings. The $\pi$–G compare unit 143 functions to supply a $\pi$–G compare signal to turn Off the counter control trigger 141 when the condition of the error-type storage register 123 corresponds to the condition of the second $m$-sequence generator 121. The counter 140 therefore counts the number of shift pulses which occur during the time the P–F compare signal is generated until the $\pi$–G compare signal is generated. The state of the counter 140 indicates the type of error that has occurred and is supplied to the error correcting means 106. In this instance a 0-count condition indicates a single error, a 1-count condition indicates a double error, a 2-count condition indicates a double nonadjacent error, and a 3-count condition indicates a triple adjacent error.

The error correcting means 106 comprises a reversible counter 156, a count modification unit 157, a corrector register 158 which is connected to the shift register 101 through a gate unit 158G and a corrector modification unit 159.

The reversible counter 156 is supplied with forward driving pulses under the control of a forward drive trigger 161, and counts from 0–14. The forward driving pulses are obtained through AND gate 160 which has one terminal supplied with shift pulses S16–S30, and the other terminal connected to the output terminal **161*b* of the trigger 161. Output terminal 161*b* is normally low and is raised to a high condition when the trigger changes state in response to an error signal supplied to terminal 161*a* from the error trigger 132. The trigger 161 is reset to its initial condition in response to a P–F compare signal. The counter 156 is supplied with reverse driving pulses under the control of the reverse drive trigger 166. Reverse drive trigger 166 has an output terminal 166*b* connected to one input of AND gate 167 whose other input terminal is supplied with shift pulses S1–S15. Terminal 166*b* is normally low and is raised to a high condition when the trigger 166 changes state in response to an S30 pulse. The trigger 166** is returned to its original condition when the counter returns to a 0 count condition.

The count modification unit 157 functions to change the state of the counter a predetermined amount depending upon the state of the error-type counter 140 of the error determining means 105. The count modification unit 157 in this instance causes the counter to retreat four count positions if a double adjacent error is determined, retreat an additional four count positions if a double nonadjacent error is determined, and retreat still further another two positions if a triple adjacent error is determined. Any suitable pulse generator for supplying the modifying pulse may be employed in the count modification unit 157.

The corrector modification unit 159 functions to insert a corrector into the corrector register 158 in accordance with the type of error indicated by the error-type indicating means 105. The corrector modification unit supplies particular signals to the respective stages of the corrector register 158 in order that the particular type of error detected will be corrected.

The corrector register 158, as shown in FIG. 5, is connected to the last three stages 13–15 of the shift register 101 through gating unit 158G, which is conditioned in response to a signal from the "correct-command" unit. The correct-command unit includes a correct-command trigger 164 and AND gate 165. Terminal 164*b* of trigger 164 is connected to AND gate 165, which is also supplied with a signal from the reversible counter 156 when the counter reaches a 1-count condition. Terminal 164*b* is normally low and is raised to a high condition when trigger 164 changes states in response to an S30 signal. Terminal 164 is returned to its initial state when the counter 156 reaches a 0-count condition.

Shift pulses S1–S15 supplied to the shift register 101 cause the fifteen bit code group to be shifted to the utilization device 15 through the transfer means 109 when AND gate 101A is conditioned by the "no error signal" from error trigger 132. The decoder is arranged so that when an error is determined, it is corrected as the data is being transferred out, the last three stages 13, 14 and 15 of the shift register serving as the correcting station. The "correct command" is supplied to the corrector register gate unit 158G when the bit position in which the error starts is in stage 15 of the shift register 101.

The transfer means 109 in this instance comprises an OR gate 170, a delay unit 171, and a pair of AND gates 172 and 173. AND gates 172 and 173 each have three input terminals. One terminal of each AND gate is connected to the last stage of the shift register 101. A second terminal of each AND gate is connected to terminal 132*b* of error trigger 132. The third terminal of AND gate 172 is supplied with clock pulses C1–C6, while the third terminal of AND gate 173 is supplied with clock pulses C8–C10. The output of AND gate 172 is connected to the utilization device 15 through a one bit delay unit 171 and OR circuit 170. The output of AND gate 173 is connected to the utilization device 15 directly through OR gate 170. The nine data bits of the transmitted code group are therefore always supplied to the utilization device 15 without error.

The operation of the decoder shown in FIG. 5 may be seen by reference to FIGS. 6–6*c*. FIG. 6 is a chart illustrating the condition of the locator parity bit storage register 112, the first *m*-sequence generator 110, the error type parity bit storage register 123, the second *m*-sequence generator 121, and the shift register 101 at various times during a normal cycle of the decoder. The chart of FIG. 6 illustrates the operation of the decoder when, for example, the fifteen bit code group transmitted from the encoder 11 is received correctly.

Assuming the previous code group was received without error, the source of clock pulses 107 supplies clock pulses C1–C15 to the decoder input AND gate 114, which gates each bit of the new code group to the first stage of the shift register 101, the sampling circuit 111, and the sampling circuit 122. Shift pulses S1–S15 from the source of shift pulses 108 are supplied to the shift register 101 through AND gate 101A, so that the received code group is shifted into the register from left to right. Shift pulses S1–S15 are also supplied to the first and second *m*-sequence generators 110 and 121, respectively. As each bit of the code group is received it is supplied to the sampling circuits 111 and 122 which have been conditioned by the output signals from the *m*-sequence generators 110 and 121. These output signals sequentially condition the sampling circuits 111 and 122 so that a reception parity check is made over the bit positions of the received code group determined by the *m*-sequences employed in the encoder. Hence, if the fifteen bit code group is received correctly, each of the parity bits $P_1$–$\pi_2$ will be 0. The output of OR gate 130 is therefore low, which prevents the delayed C15 pulse from turning On error trigger 132. Since the no error signal from output terminal 132*b* is high, the next group of clock pulses C1–C15 and the shift pulses S1–S15 causes the fifteen bit code group to be shifted out of the register 101 to the utilization device 15. The parity bits $P_1$–$\pi_2$ are prevented from reaching the utilization device 15 since AND gates 172 and 173 are closed during the corresponding times in the cycle. As the fifteen bit code group is shifted out of the register 101, the next fifteen bit code group is shifted into the register from the input AND gate 114.

The charts of FIGS. 6*a*–6*c* illustrate the operation of the decoder when an error exists in the code group as received. In FIG. 6*a* it is assumed that the encoder has transmitted the same code group as in FIG. 6, but that during transmission a triple adjacent error has occurred starting in the tenth bit position. The fifteen bit code group as received is shown in FIG. 6*a*, with bit positions 10, 11 and 12 ($D_9$, $\pi_1$, and $P_4$) all in error.

The operation of the decoder up to the time clock pulse C10 is supplied to the input AND gate 141 is identical to that discussed in connection with FIG. 6. However, since $D_9$, $\pi_1$ and $P_4$ are 101 in this instance (rather than 010) the $P_1$–$P_4$ stages of the locator parity bit storage register 112 are set to different values during the remaining portion of the cycle. The $\pi_1$ and $\pi_2$ stages of the error-type storage register 123 are also affected as shown.

The condition of $P_1$–$\pi_2$ stages of the registers are shown in FIG. 6*a* from clock times C9–C15. It will be seen that at the end of clock pulse time C15, $P_1$–$\pi_2$ are not all 0's, but that $P_2$ and $P_4$ are each one. The output terminal of OR gate 130 is therefore high and conditions AND gate 131. The delayed clock pulse C15 therefore is supplied to terminal 132*a* of the error trigger 132 causing it to change states. The normally high no-error signal from output terminal 132*b* changes to a low state, while the normally low error signal from output terminal 132*c* changes to a high state. Clock pulses C1–C15 are therefore prevented from conditioning input AND gate 114 and the clock pulse AND gate 107A is disabled by the no-error signal which is low. Similarly, the output AND gates 172 and 173, and AND gate 101A associated with the shift register 101 are also disabled by the no-error signal changing from its normally high condition to a low condition.

On the other hand, the error output signal from terminal 132*c* conditions the AND gate 108A associated with the source of shift pulses 108. As a result shift pulses S16–S30 are supplied to the error type determining means 105 and the error correcting means 106. Shift pulses S16–S30 may correspond to shift pulses S1–S15, but are generated only during an error cycle of the decoder. The error output signal from terminal 132*c* also turns On the forward drive trigger 161 which conditions AND gate 160 of the error locating means 106 allowing the counter 156 to be advanced by shift pulses S16–S30 during the error cycle until a P–F compare signal is obtained.

During the error cycle of the decoder, the type of error is determined by means 105 and the location of the error is determined by means 106. The received code group remains stationary in the shift register 101, and, hence, no data is supplied to register 101 or taken from it. The *m*-sequence generators 110 and 121 continually cycle since they are always supplied with shift pulses S1–S15. At some time during the error cycle the condition of the *m*-sequence generator 110 will correspond to the condition of the locator parity bit storage register 112 and will cause the P–F compare unit 142 to generate a P–F compare signal. The P–F compare signal is employed to turn Off the forward drive trigger 161 and turn On the counter control trigger 141. As shown in FIG. 6*b* the P–F compare signal is obtained at the end of shift pulse S20 when the condition of the $m$-sequence generator is 0101 and corresponds to the locator parity bits $P_1$–$P_4$. Counter 156 is therefore in a 5-count condition having been supplied with shift pulses S16–S20.

Since the output signal from terminal 141*b* of the counter control trigger 141 is now high, AND gate 144 is conditioned supplying shift pulses beginning with S21 to advance the counter 140 until a $\pi$–G compare signal turns the counter control trigger 141 to its initial state. In the illustrated example of a triple adjacent error no $\pi$–G compare signal is generated, and, hence, counter 140 is advanced to its farthest count position of 3, indicating a triple adjacent error.

It can be shown that if only a single error starting in bit position five had occurred $\pi_1$ and $\pi_2$ would correspond to $G_1$ and $G_2$, respectively, at the end of shift pulse S20, and hence control trigger 141 would not change states at the end of shift pulse S20. Similarly, if a double adjacent error had occurred starting in bit position one, it can be shown that the $\pi$–G compare signal would be generated at the end of shift pulse S21, and hence counter 140 would be advanced only one count position. Also, if a double nonadjacent error had occurred starting in bit position 12 it can be shown that the $\pi$–G compare signal would be generated at the end of shift pulse S22. These conditions are tabulated below for reference.

SINGLE ERROR IN BIT POSITION FIVE

| | $\pi_1$ | $\pi_3$ | $G_1$ | $G_2$ | | Counter 140 |
|---|---|---|---|---|---|---|
| S20 P–F Compare | 1 | 0 | 1 | 0 | $\pi$–G Compare | 0 |

DOUBLE ERROR STARTING IN BIT POSITION ONE

| | | | | | | |
|---|---|---|---|---|---|---|
| S20 P–F Compare | 1 | 1 | 1 | 0 | | 0 |
| S21 | 1 | 1 | 1 | 1 | $\pi$–G compare | 1 |

DOUBLE NONADJACENT ERROR STARTING IN BIT POSITION TWELVE

| | | | | | | |
|---|---|---|---|---|---|---|
| S20 P–F Compare | 0 | 1 | 1 | 0 | | 0 |
| S21 | 0 | 1 | 1 | 1 | | 1 |
| S22 | 0 | 1 | 0 | 1 | $\pi$–G Compare | 2 |

TRIPLE ADJACENT ERROR STARTING IN BIT POSITION TEN

| | | | | | | |
|---|---|---|---|---|---|---|
| S20 P–F Compare | 0 | 0 | 1 | 0 | | 0 |
| S21 | 0 | 0 | 1 | 1 | | 1 |
| S22 | 0 | 0 | 0 | 1 | | 2 |
| S23 | 0 | 0 | 1 | 0 | No Compare | 3 |

It will be seen that the state of counter 140 indicates the type of error that has occurred. With this information it is possible to determine the bit position where the error starts since the locator subwords for double adjacent errors, double nonadjacent errors and triple adjacent errors have a predetermined relation to the locator subwords for a single error.

The output of counter 140 is connected by suitable means (not shown), to both the count modification unit 157 and to the corrector modification unit 159. A 0-count signal from counter 140 does not operate either of the modification units. However, a 1-count signal from counter 140 causes the count modification unit 157 to modify the state of the reversible counter 156 by four count conditions in the reverse direction from the count condition established by the forward driving pulses S16–S30. The state of the counter 156 at the end of shift pulse S21, as shown in FIG. 6*b*, is 1. The 2-count pulse signal from counter 140 causes a similar modification, and, hence, the count condition of counter 156 at the end of shift pulse S22 is twelve. The 3-count signal from counter 140 causes a modification of the counter 156 by two count positions, and, hence, at the end of shift pulse S23 the counter 156 reads ten. The 10-count condition is maintained through the remaining portion of the error cycle.

The 1, 2, and 3-count signals from counter 140 also cause the corrector register to be modified so as to contain the appropriate corrector corresponding to the type of error indicated. The corrector is normally in a 001 condition, is changed to a 011 condition in response to a 1-count signal, is changed to a 101 condition in response to a 2-count signal, and is again changed to a 111 condition by a 3-count signal. The 111 condition of the corrector register is maintained for the completion of the error cycle.

As shown in FIG. 6*b*, at the end of shift pulse S30, which is the last shift pulse of the error cycle, the reversible counter is at a 10-count condition and the corrector register is at a 111 condition. Shift pulse S30 resets error trigger 132 to its original condition, and also turns On the reverse drive trigger 166, which conditions AND gate 167. Shift pulse S30 is also supplied to the correct-command trigger 164 which conditions AND gate 165.

The decoder 12 then enters a normal cycle where shift pulses S1–S15 shift the code group contained in shift register 101 to the utilization device 15 and at the same time allows a new fifteen bit code group to be entered into the shift register. This cycle corresponds to that shown in FIG. 6, except that the reversible counter 156 is also supplied with shift pulses S1–S15 through AND gate 167. When the counter 156 reaches a 1-count condition, a signal is supplied to AND gate 165, which provides a correct-command signal to gate unit 158G. It will be seen from FIG. 6*c* that when the counter 156 reaches a 1-count condition, the bit position where the error starts is in the last stage of the shift register 101. In the assumed example of a triple adjacent error the corrector register is set to 111 so that when gate unit 158G is supplied with the correct-command signal from AND gate 165 the binary values of the bits in stages 13, 14 and 15 (101) are changed to 010 thereby correcting the triple adjacent error. The corrected bits and the following bits are subsequently shifted out of the shift register 101 in the normal manner. The 0-count signal from the counter 156 resets the reverse drive trigger 166 and the command trigger 164.

It will thus be seen that the above described error correcting system insures that the data supplied to the utilization device 15 is accurate.

Various modifications to both the encoder and the decoder will become apparent to those persons skilled in the art. For example, while the $m$-sequence generators have been shown and described as maximal length binary shift registers they may, of course, be replaced by any suitable device providing the same function. For example, since the $m$-sequence generators 110 and 121 run continually they may be readily substituted by corresponding recorded signals. Alternately, a suitable delay line device could also be employed. It should also be noted that the error cycle defined by shift pulses S16–S30 need not necessarily correspond in length to a normal cycle defined by shift pulses S1–S15, but could occur at a much higher rate.

While the invention has been particularly shown and described with reference to a preferred embodiment thereof, it will be understood by those skilled in the art that various changes in form and details may be made therein without departing from the spirit and scope of the invention.

What is claimed is:

1. In combination with an information handling system having a source of binary coded multi-bit data signals and a device for utilizing said signals, an error correcting system interconnecting said data source and said utilization device operable to detect, locate and correct a plurality of different types of related errors occurring during the translation of said data signals to said device, said correcting system including an encoder, a detector, and signal translating means connected therebetween, said encoder comprising means for supplying to said signal translating means a code group signal consisting of a predetermined number of data bits, a predetermined number of locator parity bits and a predetermined number of error-type parity bits, said supplying means including means for generating said locator parity bits from bit positions of said code group signal determined by a first *m*-sequence and means for generating said error-type parity bits from bit positions determined by a second *m*-sequence, said decoder comprising means for generating reception parity bits from said code group signal as received over bit positions determined by said *m*-sequences, and means under the control of said generated reception parity bits operable to correct any one of said different types of related errors prior to supplying an erroneous data bit to said utilization device.

2. The combination recited in claim 1 in which said locator parity bit generating means comprises a storage register having one stage for each locator parity bit to be generated, a plurality of sampling circuits each having an output terminal connected to a different said stage, means for sequentially supplying bits of said data signal to each of said sampling circuits, and an *m*-sequence generator connected to said sampling circuits for supplying trains of sampling signals thereto corresponding to said *m*-sequence.

3. The combination recited in claim 2 in which said error-type parity bit generating means comprises a storage register having one stage for each error-type parity bit to be generated, a plurality of sampling circuits each having an output terminal connected to a different said stage means, for sequentially supplying bits of said data signal to said sampling circuits, and an *m*-sequence generator connected to said sampling circuits to supply trains of sampling signals thereto corresponding to said second *m*-sequence.

4. The combination recited in claim 3 in which said *m*-sequence generators comprise maximal length binary shift registers.

5. The combination recited in claim 1 in which said reception parity bit generating means includes means for generating a plurality of locator reception parity bits from bit positions of the received signal determined by said first *m*-sequence and a plurality of error type reception parity bits from bit positions of said received signal determined by said second *m*-sequence.

6. The combination recited in claim 5 in which said locator reception parity bit generating means and said error-type reception parity bit generating means each comprises an *m*-sequence generator, a sampling circuit responsive to said *m*-sequence generator and the bits in the received signal and a storage register for storing the outputs of said sampling circuit.

7. The combination recited in claim 6 in which said *m*-sequence generators comprise maximal length binary shift registers.

8. A system operable to detect locate and correct $2^{K}2$ types of related errors in a transmitted code group of N binary bit positions consisting of $K_1$ locator parity bits, $K_2$ error-type parity bits and M data bits where $N=2^{K}$ 1—1, comprising in combination an encoder, a decoder, and means connected therebetween for transmitting said code group from said encoder to said decoder, said encoder comprising means for generating $K_1$ locator parity bits over bit positions of said code group determined in accordance with a first *m*-sequence, means for generating $K_2$ error-type parity bits over bit positions of said code group determined in accordance with a second *m*-sequence, and means for supplying said parity bits and said data bits to said transmitting means in a predetermined order, said decoder comprising means to receive said transmitted code group, means for making a reception parity check over bit positions of said received code group in accordance with said *m*-sequences to provide $K_1+K_2$ parity bits and circuit means under the control of said $K_1+K_2$ parity bits for detecting the presence of an error, determining the type of error, locating the position of said error and correcting said error.

9. The combination recited in claim 8 in which the means for making said reception parity check comprises first and second *m*-sequence generating means for generating first and second *m*-sequence signals and means responsive to said first and second *m*-sequence signals to provide the $K_1+K_2$ parity bits.

10. The combination recited in claim 9 and first and second register means responsive to said first and second *m*-sequence signals to store said parity bits.

11. The invention recited in claim 10 in which said circuit means for detecting an error includes logic means connected to said register means for generating an error signal in response to a predetermined condition of said stored parity bits.

12. The invention recited in claim 11 in which said circuit means for determining the type of error comprises a counter, means for enabling said counter in response to a predetermined relationship between said fist *m*-sequence generator and said first register means, and means for disabling said counter in response to a predetermined relationship between said second *m*-sequence generator and said second register.

13. The invention recited in claim 12 in which said circuit means for locating the position of said error including a second counter, means for enabling said second counter in response to said error signal, means for disabling said second counter in response to said predetermined relationship between said first *m*-sequence generator and said first register, and means for modifying the condition of said second counter under the control of the count condition of said first counter whereby the modified count condition of said second counter provides an indication of bit position in said code group where said error is located.

14. The invention recited in claim 13 in which said circuit means for correcting said error comprises a corrector register, means for controlling the condition of said corrector register in response to the condition of said first counter, and means for supplying a corrector to said code group under the control of said second counter whereby said error is corrected.

References Cited by the Examiner

UNITED STATES PATENTS

| | | | |
|---|---|---|---|
| 2,552,629 | 5/51 | Hamming | 340—147 |
| 2,926,215 | 2/60 | Slepian | 178—23 |
| 2,954,433 | 9/60 | Lewis | 340—146.1 |
| 2,956,124 | 10/60 | Hagelbarger | 178—23 |

MALCOLM A. MORRISON, *Primary Examiner.*

IRVING L. SRAGOW, STEPHEN W. CAPELLI, *Examiners.*